(12) United States Patent
Yang

(10) Patent No.: US 12,652,595 B2
(45) Date of Patent: Jun. 9, 2026

(54) METHOD AND APPARATUS FOR DETERMINING TARGET CELL OF UE, COMMUNICATION DEVICE, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 461 days.

(21) Appl. No.: 18/249,211

(22) PCT Filed: Oct. 15, 2020

(86) PCT No.: PCT/CN2020/121314
§ 371 (c)(1),
(2) Date: Apr. 14, 2023

(87) PCT Pub. No.: WO2022/077393
PCT Pub. Date: Apr. 21, 2022

(65) Prior Publication Data
US 2023/0413150 A1     Dec. 21, 2023

(51) Int. Cl.
*H04W 36/30* (2009.01)
*H04W 36/00* (2009.01)
*H04W 36/08* (2009.01)

(52) U.S. Cl.
CPC ....... *H04W 36/30* (2013.01); *H04W 36/0058* (2018.08); *H04W 36/08* (2013.01)

(58) Field of Classification Search
CPC . H04W 36/30; H04W 36/0058; H04W 36/08; H04W 36/00835; H04W 36/302;
(Continued)

(56) References Cited

U.S. PATENT DOCUMENTS

| | | | |
|---|---|---|---|
| 2014/0045498 A1 | 2/2014 | Choi et al. | |
| 2015/0126193 A1* | 5/2015 | Huang | H04W 36/0085 455/436 |
| 2021/0306935 A1* | 9/2021 | Do | H04W 48/16 |

FOREIGN PATENT DOCUMENTS

| | | |
|---|---|---|
| CN | 101815330 A | 8/2010 |
| CN | 102905306 A | 1/2013 |

(Continued)

OTHER PUBLICATIONS

Tseng et al., "POMDP-Based Cell Selection Schemes for Wireless Networks", IEEE Xplore, 2014, 4 pages. (Year: 2014).*
(Continued)

*Primary Examiner* — Quoc Thai N Vu
(74) *Attorney, Agent, or Firm* — Oblon, McClelland, Maier & Neustadt, L.L.P.

(57) ABSTRACT

A method and an apparatus for determining a target cell of UE, a communication device, and a storage medium, the method for determining a target cell of UE including: determining, based on measured signal quality on a cell, a candidate cell for cell handover or cell reselection; determining, based on a mobility management parameter and a benefit algorithm model, an expected benefit of accessing the candidate cell; and selecting, based on the expected benefit, from the candidate cell a target cell for cell handover or cell reselection.

19 Claims, 6 Drawing Sheets

(58) Field of Classification Search
CPC ........... H04W 36/0055; H04W 36/165; H04W
36/0088; H04W 36/362; H04W 36/0085;
H04W 36/34; H04W 36/36; H04W 36/00;
H04W 36/24; H04L 41/142
See application file for complete search history.

(56) References Cited

FOREIGN PATENT DOCUMENTS

| | | | |
|---|---|---|---|
| CN | 111050373 | A | 4/2020 |
| CN | 111726845 | A | 9/2020 |
| EP | 2 731 378 | A1 | 5/2014 |
| WO | WO 2020/159430 | A1 | 8/2020 |

OTHER PUBLICATIONS

International Search Report issued on Jul. 15, 2021, in PCT/CN2020/ 121314, filed on Oct. 15, 2020, 3 pages.
Combined Chinese Office Action and Search Report issued on Oct. 31, 2022 in Chinese Patent Application No. 202080002751.0 (with unedited computer-generated English translation), 16 pages.
Wang et al., "Neighbor Cell List Optimization in Handover Management Using Cascading Bandits Algorithm", IEEE Access, vol. 8, Jul. 21, 2020 (Jul. 21, 2020), pp. 134137-134150.
Yajnanarayana et al., "5G Handover using Reinforcement Learning", 2020 IEEE 3rd 5G World Forum (5GWF), Oct. 13, 2020 (Oct. 13, 2020), pp. 349-354.

* cited by examiner

| User equipment | Base station |
|---|---|

S21: a candidate cell for cell handover or cell reselection is determined according to measured signal quality on a cell S22: an expected benefit for accessing the candidate cell is determined according to a mobility management parameter and a benefit algorithm model S24: an exploration probability of the candidate cell is updated according to the expected benefit and number of times the candidate cell is selected as the target cell S231: the target cell for cell handover or cell reselection is selected from the candidate cell according to the expected benefit and the exploration probability Wireless communication

FIG. 3

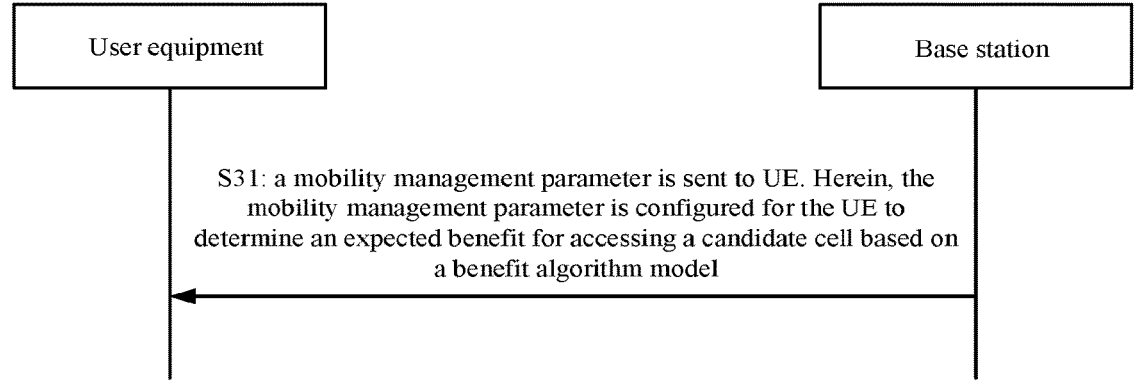

| User equipment | Base station |
|---|---|

S31: a mobility management parameter is sent to UE. Herein, the mobility management parameter is configured for the UE to determine an expected benefit for accessing a candidate cell based on a benefit algorithm model

FIG. 4

METHOD AND APPARATUS FOR DETERMINING TARGET CELL OF UE, COMMUNICATION DEVICE, AND STORAGE MEDIUM

CROSS REFERENCE TO RELATED APPLICATIONS

The present disclosure is a U.S. national phase application of International Application No. PCT/CN2020/121314 filed on Oct. 15, 2020, which is incorporated herein by reference in its entirety.

TECHNICAL FIELD

The present disclosure relates, but is not limited to the field of wireless communication, in particular to a method and an apparatus for determining a target cell of UE, a communication device, and a storage medium.

BACKGROUND

Machine learning algorithms are currently one of the most important implementation methods in artificial intelligence technology. Machine learning can obtain models through a large amount of training data, through which events can be predicted. In many fields, models trained by machine learning can achieve very refined prediction results.

SUMMARY

Embodiments of the present disclosure discloses a method and an apparatus for determining a target cell of UE, and a communication device, and a storage medium.

According to a first aspect of embodiments of the present disclosure, a method for determining a target cell of UE is provided, which is applied to user equipment (UE), and includes: determining, according to measured signal quality on a cell, a candidate cell for cell handover or cell reselection; determining, according to a mobility management parameter and a benefit algorithm model, an expected benefit for accessing the candidate cell; and selecting, according to the expected benefit, a target cell for cell handover or cell reselection from the candidate cell.

According to a second aspect of embodiments of the present disclosure, a method for determining a target cell of UE is provided, which is applied to a base station, and includes: sending a mobility management parameter to user equipment (UE), wherein the mobility management parameter is configured for the UE to determine an expected benefit for accessing a candidate cell based on a benefit algorithm model; the expected benefit is configured for the UE to select a target cell for cell handover or cell reselection from the candidate cell, and the candidate cell is determined based on measured signal quality on the cell.

According to a third aspect of embodiments of the present disclosure, an apparatus for determining a target cell of UE is provided, which is applied to a user equipment (UE), and includes: a determination module configured to determine, according to measured signal quality on a cell, a candidate cell for cell handover or cell reselection; a calculation module configured to determine, according to a mobility management parameter and a benefit algorithm model, an expected benefit for accessing the candidate cell; and a selection module configured to select, according to the expected benefit, a target cell for cell handover or cell reselection from the candidate cell.

According to a fourth aspect of embodiments of the present disclosure, an apparatus for determining a target cell of UE is provided, which is applied to a base station, and includes: a second sending module configured to send a mobility management parameter to user equipment (UE), wherein the mobility management parameter is configured for the UE to determine an expected benefit for accessing a candidate cell based on a benefit algorithm model; the expected benefit is configured for the UE to select a target cell for cell handover or cell reselection from the candidate cell, and the candidate cell is determined based on measured signal quality on the cell.

According to a fifth aspect of embodiments of the present disclosure, a communication device is provided, including: a processor; and a memory for storing instructions executable by the processor; the processor is configured to execute the instructions to implement the method for determining a target cell of UE according to any embodiment of the present disclosure.

According to a sixth aspect of the present disclosure, a computer storage medium is provided, which stores computer executable programs, which when executed by a processor, cause the method for determining a target cell of UE according to any embodiment of the present disclosure to be implemented.

It should be understood that general description above and detailed description in the following are only illustrative and explanatory, and do not limit embodiments of the present disclosure.

BRIEF DESCRIPTION OF THE DRAWINGS

FIG. 3 is a schematic diagram of a method for determining a target cell of UE according to an exemplary embodiment.

FIG. 4 is a schematic diagram of a method for determining a target cell of UE according to an exemplary embodiment.

DETAILED DESCRIPTION

Figure 1:
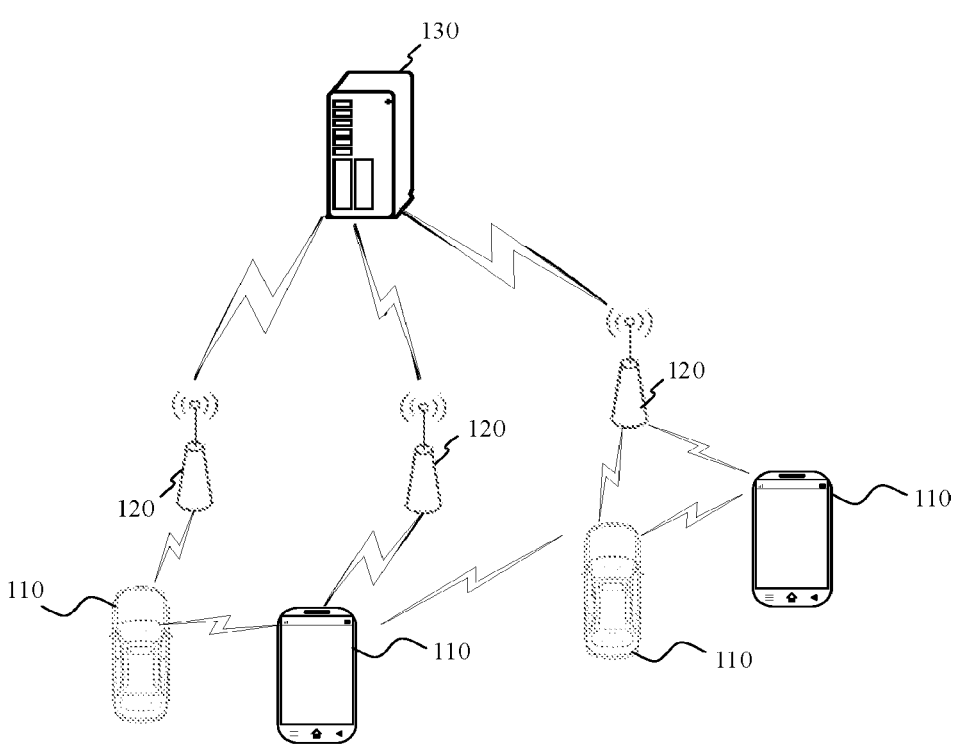
FIG. 1 is a schematic diagram of a structure of a wireless communication system.

Exemplary embodiments will be explained herein in detail, and examples are illustrated in the drawings. When referring to the drawings, unless otherwise indicated in the following descriptions, the same numerals in different drawings represent the same or similar elements. Implementations described in following exemplary embodiments do not represent all implementations consistent with the present disclosure. Instead, they are only examples of devices and methods consistent with some aspects of embodiments of the present disclosure as detailed in the attached claims.

Terms used in embodiments disclosed in the present disclosure are for the purpose of description of specific embodiments only, and are not intended to limit the embodiments of the present disclosure. Singular forms such as "a" and "the" used in embodiments of the present disclosure and the attached claims are also intended to include plural forms, unless other meanings are clearly indicated in the context. It should also be understood that the term "and/or" used herein refers to and includes any or all possible combinations of one or more related items listed.

It should be understood that although terms such as first, second, and third may be used to describe various information in embodiments of the present disclosure, these information should not be limited to these terms, which are only used to distinguish information of the same type from each other. For example, without departing from the scope of the present disclosure, the first information can also be referred to as the second information, and similarly, the second information can also be referred to as the first information. The word "if" used herein can be interpreted as "when" or "while" or "in response to determination that", depending on the context.

Reference is made to FIG. 1, which illustrates a schematic diagram of a structure of a wireless communication system provided by embodiments of the present disclosure. As shown in FIG. 1, the wireless communication system is a communication system based on cellular mobile communication technology, which may include several user equipment 110 and several base stations 120.

User equipment 110 can be equipment that provides voice and/or data connectivity to a user. User equipment 110 can communicate with one or more core networks via a Radio Access Network (RAN). User equipment 110 can be IoT (Internet of Things) user equipment, for example, sensor devices, mobile phones (or "cellular" phones), and computers with IoT user equipment, such as fixed, portable, pocket, handheld, computer built-in, or vehicle mounted devices. For example, stations (STA), subscriber units, subscriber stations, mobile stations, mobiles, remote stations, access points, remote terminals, access terminals, user terminals, user agents, user devices or user equipment. Alternatively, user equipment 110 can also be a device for unmanned aerial vehicles. Alternatively, user equipment 110 can also be onboard devices, such as a trip computer with wireless communication ability or wireless user equipment connected to an external trip computer. Alternatively, user equipment 110 can also be roadside devices, such as street lights, signal lights, or other roadside devices with wireless communication ability.

Base station 120 can be a network side device in the wireless communication system. The wireless communication system can be the 4th generation (4G) mobile communication system, also known as Long Term Evolution (LTE) system. Alternatively, the wireless communication system can also be the 5th generation (5G) system, also known as New Radio system or 5G NR system. Alternatively, the wireless communication system can also be the next generation system following 5G system. The access network in 5G system can be referred to as the New Generation-Radio Access Network (NG-RAN).

Base station 120 can be the Evolved Node B (eNB) employed in 4G system. Alternatively, base station 120 can also be the next Generation Node B (gNB) constructed in a centralized and distributed architecture in 5G system. When constructed in the centralized and distributed architecture, base station 120 usually includes a central unit (CU) and at least two distributed units (DUs). The central unit is provided with a protocol stack consisting of the Packet Data Convergence Protocol (PDCP) layer, the Radio Link Control (RLC) layer, and the Medium Access Control (MAC) layer. The distributed unit is provided with a protocol stack of the Physical (PHY) layer. Specific implementations of base station 120 are not limited in embodiments of the present disclosure.

A wireless connection can be established between the base station 120 and the user equipment 110 via a wireless air interface. In different implementations, the wireless air interface is based on the 4th generation (4G) mobile communication network technology standard. Alternatively, the wireless air interface is based on the 5th generation (5G) mobile communication network technology standard, for example, the wireless air interface is the New Radio. Alternatively, the wireless air interface can also be a wireless air interface based on the next generation mobile communication network technology standard following 5G.

In some embodiments, an E2E (End to End) connection can also be established between user equipment 110. For example, in vehicle to everything (V2X) communication, there are scenarios where vehicle to vehicle (V2V) communication, vehicle to infrastructure (V2I) communication, and vehicle to pedestrian (V2P) communication are established.

Herein, above user equipment can be considered as a terminal device in following embodiments.

In some embodiments, the wireless communication system described above can also include a network management device 130.

Some of base stations 120 are respectively connected to the network management device 130. The network management device 130 can be a core network device in the wireless communication system, for example, the network management device 130 can be the Mobility Management Entity (MME) in the Evolved Packet Core (EPC). Alternatively, the network management device can also be other core network devices, such as the Service GateWay (SGW), the Public Data Network GateWay (PGW), the Policy and Charging Rules Function (PCRF), or the Home Subscriber Server (HSS). Implementations of the network management device 130 are not limited in embodiments of the present disclosure.

Figure 2:
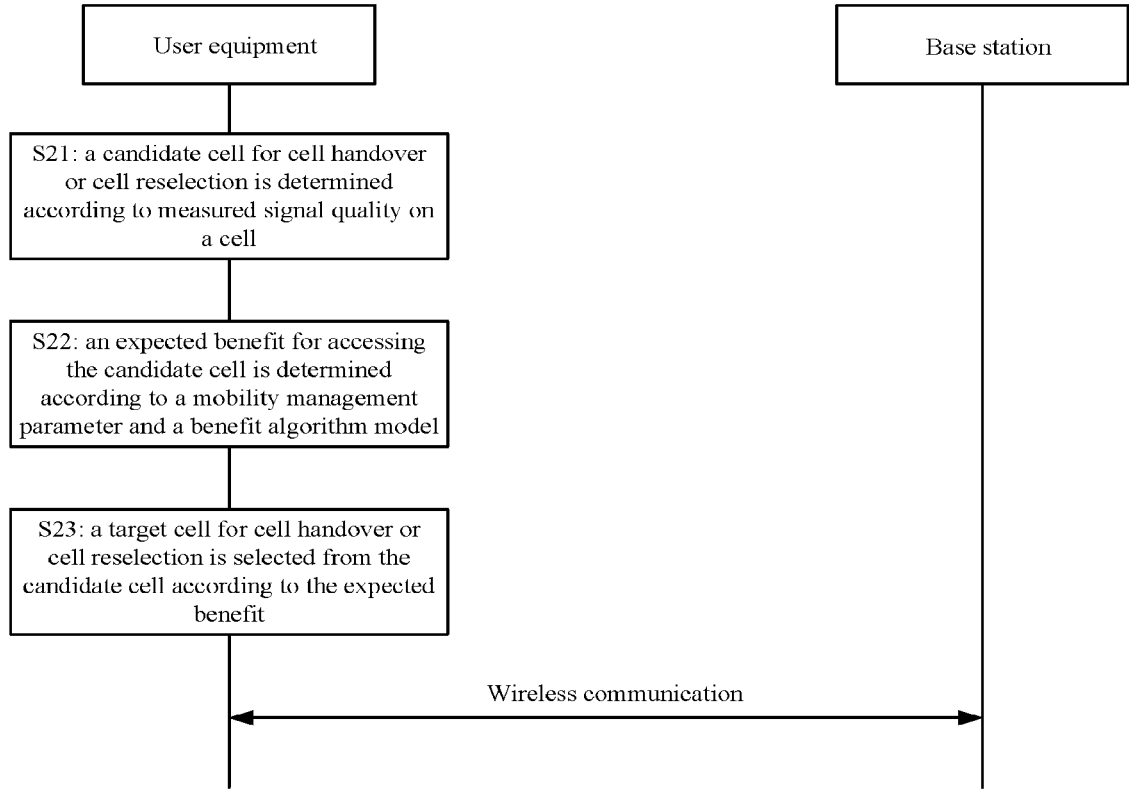
FIG. 2 is a schematic diagram of a method for determining a target cell of UE according to an exemplary embodiment.

As shown in FIG. 2, embodiments of the present disclosure provide a method for determining a target cell of UE, which is applied to user equipment (UE) and includes following steps.

In step S21, a candidate cell for cell handover or cell reselection is determined according to measured signal quality on a cell.

In step S22, an expected benefit for accessing the candidate cell is determined according to a mobility management parameter and a benefit algorithm model.

In step S23, a target cell for cell handover or cell reselection is selected from the candidate cell according to the expected benefit.

The user equipment in embodiments of the present disclosure can be various types of user equipment, for example, mobile phones, smart terminals, computers, servers, transceivers, tablet devices, or medical devices. For another example, the user equipment can be game consoles, multimedia devices, or wearable devices.

The base station in embodiments of the present disclosure is an interface device for enabling accessing of the user equipment to the Internet. The base station can be various types of base stations, for example, the 3G base station, the 4G base station, the 5G base station, or other evolved base stations. The base station can also be a ground network base station or a non-ground network base station.

In some embodiments, the candidate cell may include at least two candidate cells.

In some embodiments, the mobility management parameter includes at least one of:

a step size, configured to indicate an interval for one calculation of the expected benefit;

a movement expense factor, configured to indicate expense for one replacement of the cell;

a reward type, configured to indicate a type of a performance indicator being as the expected benefit;

a reward type parameter corresponding to the reward type, configured to indicate a parameter of the type of the performance indicator of the expected benefit;

a reward factor, configured to indicate a parameter for scaling the reward type;

an accumulated reward factor, configured to indicate a parameter for scaling an accumulated expected benefit;

a running length threshold, configured to indicate a maximum number of runs and/or a maximum running time for the expected benefit included in a round of calculation; and an exploration probability threshold, configured to indicate a probability value the benefit algorithm model needs to achieve when performing an exploration operation.

In some embodiments, the method for determining a target cell of UE includes:

the mobility management parameter sent by a base station is received; or the mobility management parameter is determined.

In this way, UE can obtain the mobility management parameter based on the configuration of the base station or through determination by itself.

For example, UE can obtain the step size from the mobility management parameter sent by the base station, or can determine the step size based on a moving speed of UE.

For another example, for the reward type parameter, UE can obtain an initial reward type parameter from the mobility management parameter sent by the base station, or can determine the parameter according to a current performance indicator after an inference made based on the benefit algorithm model.

The reward type herein includes but is not limited to one of throughput, transmission rate, and signal strength.

The reward type parameter herein can be a parameter corresponding to at least one of the throughput, the transmission rate, and the signal strength. For example, 40 MB/s corresponding to the transmission rate.

For another example, for the accumulated reward factor, UE can obtain an initial accumulated reward factor from the mobility management parameter sent by the base station, or can determine an $(i+1)^{th}$ accumulated reward factor after an $i^{th}$ inference made based on the benefit algorithm model. The $i^{th}$ inference made based on the benefit algorithm model herein refers to an $i^{th}$ calculation of the expected benefit based on the benefit algorithm model.

In some embodiments, UE obtains the mobility management parameter sent by the base station before using the mobility management parameter and the benefit algorithm model for calculation. The accumulated reward factor in the mobility management parameter is 0.5. If UE needs to scale up the expected benefit of each candidate cell after 3 inferences (i.e. 3 calculations of the expected benefit) based on the benefit algorithm model, the accumulated reward factor can be adjusted to 0.6. The accumulated reward factor used by UE for subsequent inferences based on the benefit algorithm model can be 0.6.

The maximum number of runs herein refers to number of inferences made by UE to perform a round of calculation by using the benefit algorithm model. One inference made based on the benefit algorithm model herein refers to one calculation of the expected benefit through the benefit algorithm model.

If the number of a round of inferences made by UE by using the benefit algorithm model is N, the expected benefit in embodiments of the present disclosure can be the expected benefit after any one of N inferences, where N is an integer greater than or equal to 1.

In some embodiments, duration for UE to use the benefit algorithm model to perform one calculation of the expected benefit is the step size.

The maximum running time herein is the maximum duration for UE to use the benefit algorithm model to perform a round of calculations. Within the maximum running time, the benefit algorithm model can be used to perform one or more calculations of the expected benefit.

In other embodiments, UE can also use other time intervals or determine based on the moving speed of UE the duration for one calculation of the expected benefit.

In other embodiments, the mobility management parameter herein can also include an exploration probability. For example, UE can obtain the exploration probability in the mobility management parameter sent by the base station, an initial value of which can be 0, meaning that an initial exploration probability of each candidate cell is 0.

In some embodiments of the present disclosure, the mobility management parameter herein can also include an expected benefit after the $n^{th}$ inference.

The benefit algorithm model herein can be models based on various algorithms for calculating the expected benefit. The benefit algorithm model includes one or more algorithms for calculating the expected benefit. For example, the algorithms included in the benefit algorithm model include but are not limited to the machine learning algorithm or the deep learning algorithm.

In embodiments of the present disclosure, the mobility management parameter is a mobility management parameter corresponding to each candidate cell. The mobility management parameters for different candidate cells herein can be the same or different. For example, the reward factor for candidate cell 1 is 0.8, and the reward factor for candidate cell 2 is 0.3. For another example, the reward type parameter for candidate cell 1 is a transmission rate of 40 MB/s, and the reward type parameter for candidate cell 2 is a transmission rate of 50 MB/s. For another example, the accumulated reward factors for both candidate cell 1 and candidate cell 2 are 0.5, and so on.

In embodiments of the present disclosure, step S22 can be implemented as: the mobility management parameter is inputted into the benefit algorithm model, and an output result is the expected benefit.

For example, the mobility management parameter for candidate cell 1 includes: the reward type parameter is a transmission rate of 40 MB/s, the reward factor is 0.8, and the accumulated reward factor is 0.5. The expected benefit after last inference made based on the benefit algorithm model is 40 MB/s. Then the transmission rate is set to 40 MB/s, the reward factor is set to 0.8, the accumulated reward factor is set to 0.5, and the expected benefit after last inference made based on the benefit algorithm model is set to 40 MB/s. The reward type parameter, the reward factor, the accumulated reward factor, and last expected benefit for candidate cell 1 are inputted into the benefit algorithm model to obtain the expected benefit for present inference.

In above examples, only the expected benefit for candidate cell 1 is calculated. In other examples, if there are a plurality of candidate cells, the expected benefits need to be calculated for the plurality of candidate cells. In above examples, the reward type parameter, the reward factor, and the accumulated reward factor in the mobility management parameter are inputted into the benefit algorithm model. In other examples, the calculation can also be based on the mobility management parameters such as the reward type parameter, the accumulated reward factor, and the movement expense factor, simply configuring appropriate algorithms for the benefit algorithm model. According to embodiments of the present disclosure, there is no need to restrict what parameters out of the mobility management parameters are inputted into the benefit algorithm model and what specific benefit algorithms are, simply the same benefit algorithm model to be used for each candidate cell for inference.

According to embodiments of the present disclosure, based on the expected benefit of each candidate cell, a candidate cell with suitable expected benefit can be selected as the target cell for cell handover or cell reselection. Compared to the cell handover or cell reselection based on the signal strength in the cell, frequent cell handover or cell reselection caused by jitter in the signal strength in the cell can at least be reduced, thereby improving the stability of the system.

In some embodiments, above step S21 can be implemented as:

a cell with the measured signal quality higher than a predetermined threshold is determined as the candidate cell for cell handover or cell reselection.

As a result, in embodiments of the present disclosure, preliminary screening can be carried out by selecting the cell with the signal quality or strength higher than the predetermined threshold as the candidate cell, so that subsequent selection of the target cell is performed among the candidate cell(s) with relatively good signal quality, thereby further improving the performance of the system.

In some embodiments, the mobility management parameter includes cell information, which is configured to identify a cell capable of being used as the candidate cell.

In some embodiments, the cell information can be an identification of each cell. After obtaining the cell information, UE directly selects respective cell as the candidate cell.

In other embodiments, the cell information can be condition information for the candidate cell. For example, the condition information for the candidate cell is that the Reference Signal Receiving Power (RSRP) is greater than a predetermined value. After obtaining the cell information, UE detects the RSRP of each cell and selects the cell with RSRP greater than the predetermined value as the candidate cell.

In some other embodiments, the cell information can be the identification and corresponding signal strength of each cell, and a signal strength threshold. After obtaining the cell information, UE determines the cell with the signal strength greater than the signal strength threshold as the candidate cell.

According to embodiments of the present disclosure, UE can determine the candidate cell based on the cell information, etc.

In some embodiments, above step S22 includes:

the expected benefit of the candidate cell after an interval equal to the step size is determined based on the mobility management parameter.

In some embodiments, above step S23 includes:

the candidate cell with the highest expected benefit is selected as the target cell for cell handover or cell reselection.

The expected benefit herein can refer to expected benefits of various reward type parameters, for example, an expected benefit of one of the transmission rate, the throughput, and the RSRP of the candidate cell. In some embodiments, the expected benefit herein can also include other parameters, such as the expense caused by handover to the candidate cell.

In embodiments of the present disclosure, UE can calculate the expected benefit of each candidate cell after every interval equal to the step size, and select from the expected benefit of each candidate cell the candidate cell with the highest expected benefit as the target cell for cell handover or cell reselection. As a result, according to embodiments of the present disclosure, the target cell with the highest benefit can be selected as much as possible for cell handover or cell reselection.

In other embodiments, the candidate cell with the expected benefit meeting with a certain threshold range can also be selected for cell handover or cell reselection. For example, any candidate cell with the expected benefit of the transmission rate ranging from 60 MB/s to 80 MB/s is selected for cell handover or cell reselection. As a result, it is also possible to select the target cell with relatively high benefit for cell handover or cell reselection.

In embodiments of the present disclosure, the expected benefit of each candidate cell is calculated after an interval equal to the step size, and the target cell for cell handover or cell reselection is selected based on the expected benefit calculated. As a result, UE makes one decision on whether to perform cell handover or cell reselection at least after an interval equal to the step size, so that frequent handover caused by jitter in the signal strength in the cell can be reduced to a certain extent.

In some embodiments, that the expected benefit of the candidate cell after an interval equal to the step size is determined based on the mobility management parameter includes:

an expected benefit of the candidate cell after an $(i+1)^{th}$ inference is determined, based on a product of an expected benefit of the candidate cell after an $i^{th}$ inference and the accumulated reward factor, as well as a product of a reward type parameter of the candidate cell after the $i^{th}$ inference and the reward factor, where i is an integer greater than 0.

In embodiments of the present disclosure, UE can calculate the expected benefit in present inference based on the benefit algorithm model and on the expected benefit in last inference. For example, the inference for implementing the benefit algorithm model can be: expected benefit i+1=expected benefit i×accumulated reward factor+reward type parameter i×reward factor. Herein, the expected benefit is the expected benefit after the $i^{th}$ inference, the expected benefit i+1 is the expected benefit after the $(i+1)^{th}$ inference, and the reward type parameter is the reward type parameter during the $(i+1)^{th}$ inference.

For example, the mobility management parameters include: a step size of 30 ms; reward factors corresponding to candidate cells 1, 2, and 3 are 0.8, 0.3, and 0.5, respectively; an accumulated reward factor of 0.5. After the $2^{nd}$ inference made based on the benefit algorithm model by UE, calculated expected benefits of candidate cells 1, 2, and 3 are 40 MB/s, 50 MB/s, and 60 MB/s, respectively, and the transmission rates of current candidate cells 1, 2, and 3 are 50 MB/s, 50 MB/s, and 60 MBs, respectively. After duration of 30 ms, UE finishes the $3^{rd}$ inference by using the benefit algorithm model, and the calculated expected benefit of candidate cell 1 is 40×0.5+50×0.8=60 MB/s, the calculated expected benefit of candidate cell 2 is 50×0.5+50×0.3=40 MB/s, and the calculated expected benefit of candidate cell 3 is 60×0.5+60×0.5=60 MB/s.

In some embodiments, that the expected benefit of the candidate cell after an interval equal to the step size is determined based on the mobility management parameter can also be implemented as:

the expected benefit of the candidate cell after an interval equal to an $(i+1)^{th}$ step size is determined, based on a product of an expected benefit of the candidate cell after an interval equal to an $i^{th}$ step size and the accumulated reward factor, as well as a product of a reward type parameter of the candidate cell after the interval equal to the $i^{th}$ step size and the reward factor, where i is an integer greater than 0.

The parameters after the interval equal to the $i^{th}$ step size are the parameters after the $i^{th}$ inference based on the benefit algorithm model. For example, the expected benefit of the candidate cell after the interval equal to the $i^{th}$ step size is the expected benefit of the candidate cell after the $i^{th}$ inference.

In embodiments of the present disclosure, the expected benefit of present inference can be calculated based on the expected benefit of each candidate cell provided in last inference, which enables a unified evaluation of the benefit of each candidate cell, thereby facilitating subsequent determination of the target cell for cell handover or cell reselection based on the expected benefit of each candidate cell.

In some application scenarios, UE calculates the expected benefit of each candidate cell after an interval equal to the step size based on the benefit algorithm model, while the handover to the target cell may not be performed after a decision on the target cell for cell handover or cell reselection is made based on the expected benefit. For example, in consideration that the target cell determined based on expected benefit may not be an optimal target cell for handover, or considering venturing to other candidate cells for cell handover or cell reselection. In some embodiments of the present disclosure, it is also possible to determine the target cell for cell handover or cell reselection by considering an exploration probability.

As shown in FIG. 3, in some embodiments, the method applied to UE further includes the following step.

In step S24, an exploration probability of the candidate cell is updated according to the expected benefit and number of times the candidate cell is selected as the target cell.

In some embodiments, above step S23 includes the following step.

In step S231, the target cell for cell handover or cell reselection is selected from the candidate cell according to the expected benefit and the exploration probability.

In some embodiments, the above step S231 includes:

in response to not selecting the target cell for cell handover or cell reselection from the candidate cell based on the expected benefit, the target cell for cell handover or cell reselection is selected from the candidate cell based on the exploration probability.

In some embodiments, above step S24 can be implemented as:

an exploration probability after an $i^{th}$ inference is determined based on an expected benefit after the $i^{th}$ inference and decision results of previous i inferences.

A decision result of the $i^{th}$ inference herein is a result that the target cell for cell handover or cell reselection selected after the $i^{th}$ inference. Based on the decision results of previous i inferences, the number of times the current candidate cell is selected as the target cell can be determined.

For example, after 10 inferences made by UE, the calculated expected benefit of candidate cell 1 is 40 MB/s, and the calculated expected benefit of candidate cell 2 is 60 MB/s. In the first 10 inferences, the number of times candidate cell 1 is selected as the target cell is 3. The number of times candidate cell 2 is selected as the target cell is 1. It can be determined that the exploration probabilities of candidate cell 1 and candidate cell 2 after the $10^{th}$ inference are 0.7 and 0.6, respectively.

In other embodiments, the exploration probability after the $i^{th}$ inference can also be determined based on at least one of the expected benefit after the $i^{th}$ inference, the number of inferences having been made, and the movement expense factor. For example, after 10 inferences made by UE, the calculated expected benefit of candidate cell 1 is 40 MB/s, and the calculated expected benefit of candidate cell 2 is 60 MB/s. In consideration that 10 inferences have been made and the calculated expected benefits are closer to reality, it can be determined that the exploration probabilities of candidate cell 1 and candidate cell 2 after the $10^{th}$ inference are 0.7 and 0.8, respectively.

In embodiments of the present disclosure, UE can determine the exploration probability based on the expected benefit, and when UE does not select the target cell for cell handover or cell reselection based on expected benefit, the target cell can also be determined based on the exploration probability. As a result, more application scenarios can be adapted and various factors for cell handover or cell reselection can be comprehensively considered, thereby improving the probability for handover to the most suitable target cell.

In some embodiments, that the target cell for cell handover or cell reselection is selected from the candidate cell based on the exploration probability includes:

a candidate cell with the exploration probability meeting with an exploration probability threshold is selected as the target cell for cell handover or cell reselection; or a candidate cell is randomly selected as the target cell for cell handover or cell reselection.

Herein, that the exploration probability of the candidate cell meets with the exploration probability threshold means the exploration probability of the candidate cell is greater than the exploration probability threshold.

In embodiments of the present disclosure, if UE selects a candidate cell with the exploration probability greater than or equal to the exploration probability threshold as the target cell for cell handover or cell reselection, a target cell with better performance is selected for the handover as much as possible. If UE randomly selects a candidate cell for cell handover or cell reselection, multiple selection methods are provided for selecting the target cell, improving the flexibility of cell handover or cell reselection.

In some embodiments, the method for determining a target cell of UE includes:

after an $i^{th}$ inference made based on the benefit algorithm model, at least one of an exploration probability after the $i^{th}$ inference, an $i^{th}$ expected benefit, an $(i+1)^{th}$ reward type parameter, and an $(i+1)^{th}$ reward factor is updated, where i is an integer greater than 0.

In other embodiments, after each inference made based on the benefit algorithm model, at least one of the exploration probability, the expected benefit, the reward type parameter, and the $(i+1)^{th}$ reward factor after each inference, is stored by UE, as well as the identification of each inference correspondingly.

In some embodiments, the method for determining a target cell of UE includes:

the mobility management parameter including updated exploration probability is reported.

In embodiments of the present disclosure, UE will report the mobility management parameter including the updated exploration probability after each update of the exploration probability. In some examples, the mobility management parameter reported includes at least the updated exploration probability. In other examples, the mobility management parameter reported can also include other updated mobility management parameters, such as an updated expected benefit, an updated reward type parameter, etc.

Alternatively, UE can also report the mobility management parameter including the updated exploration probability based on preset time intervals.

In other embodiments, that the mobility management parameter including the updated exploration probability is reported includes:

the mobility management parameter including the updated exploration probability is reported after number of inferences made based on the benefit algorithm model achieves a threshold of number of runs.

In embodiments of the present disclosure, UE can also report, after a round of calculations based on the benefit algorithm model, the mobility management parameter including the updated exploration probability. As a result, more accurate exploration probability of each candidate cell can be provided.

In other embodiments, UE can also report, when number of inferences made based on the benefit algorithm model achieves a predetermined number less than the threshold of number of runs, the mobility management parameter including the updated exploration probability.

In some other embodiments, the method further includes:

a request message sent by the base station is received.

In some embodiments, that the mobility management parameter including the updated exploration probability is reported includes:

the mobility management parameter including the updated exploration probability is reported based on the request message.

In embodiments of the present disclosure, the mobility management parameter including the updated exploration probability can also be reported based on the request message sent by the base station. As a result, the number of reports can be reduced to a certain extent, thereby reducing the consumption of transmission resources.

In embodiments of the present disclosure, the updated exploration probability or the updated mobility management parameter can be reported to a base station or a core network entity. As a result, the base station and the core network entity can be aware of the cell handover or cell reselection conducted by current UE or other UEs in the same area, so as to provide guidance for subsequent cell handover or cell reselection conducted by current UE or other UEs in the same area.

It should be noted that in following embodiments, a method for determining a target cell of UE is provided. The method is applied to the base station, and descriptions thereof are similar with those made for the method for determining a target cell of UE, which is applied to UE. For technical details not disclosed in example implementations of the method for determining a target cell of UE, which is applied to the base station, in the present disclosure, reference can be made to descriptions made for the method for determining a target cell of UE, which is applied to UE, in the present disclosure, and no detailed explanations will be provided herein.

As shown in FIG. 4, a method for determining a target cell of UE is provided, which is applied to the base station, and includes the following step.

In step S31, a mobility management parameter is sent to UE. Herein, the mobility management parameter is configured for the UE to determine an expected benefit for accessing a candidate cell based on a benefit algorithm model.

The expected benefit is configured for the UE to select a target cell for cell handover or cell reselection from the candidate cell, and the candidate cell is determined based on measured signal quality on the cell.

In some embodiments, the mobility management parameter includes at least one of:

a step size, configured to indicate an interval for one calculation of the expected benefit;

a movement expense factor, configured to indicate expense for one replacement of the cell;

a reward type, configured to indicate a type of a performance indicator being as the expected benefit;

a reward type parameter corresponding to the reward type, configured to indicate a parameter of the type of the performance indicator of the expected benefit;

a reward factor, configured to indicate a parameter for scaling the reward type;

an accumulated reward factor, configured to indicate a parameter for scaling an accumulated expected benefit;

a running length threshold, configured to indicate a maximum number of runs and/or a maximum running time for the expected benefit included in a round of calculation; and an exploration probability threshold, configured to indicate a probability value the benefit algorithm model needs to achieve when performing an exploration operation.

In some embodiments, if the number of a round of inferences made based on the benefit algorithm model is N, the expected benefit can be an expected benefit after any one of N inferences, where N is an integer greater than or equal to 1.

A threshold of the number of runs herein is number of inferences included in a round of inferences made based on in the benefit algorithm model.

In some embodiments, the mobility management parameter includes cell information, which is configured to identify a cell capable of being used as the candidate cell.

In some embodiments, an expected benefit of the candidate cell after an $(i+1)^{th}$ inference is determined based on a product of an expected benefit of the candidate cell after an $i^{th}$ inference and the accumulated reward factor, as well as a product of a reward type parameter of the candidate cell after the $i^{th}$ inference and the reward factor.

In some embodiments, an expected benefit of the candidate cell after an interval equal to an $(i+1)^{th}$ step size is determined by UE, based on a product of an expected benefit of the candidate cell after an interval equal to an $i^{th}$ step size and the accumulated reward factor, as well as a product of a reward type parameter of the candidate cell after the interval equal to the $i^{th}$ step size and the reward factor.

In some embodiments, the method for determining a target cell of UE further includes:

a request message is sent to UE; and a mobility management parameter including an updated exploration probability is received, which is returned based on the request message.

In some embodiments, the method for determining a target cell of UE further includes:

the mobility management parameter, including the updated exploration probability, reported by the UE after number of inferences made based on the benefit algorithm model achieves a threshold of number of runs is received.

A specific example with reference to any of above embodiments is provided in the following.

Figure 5:
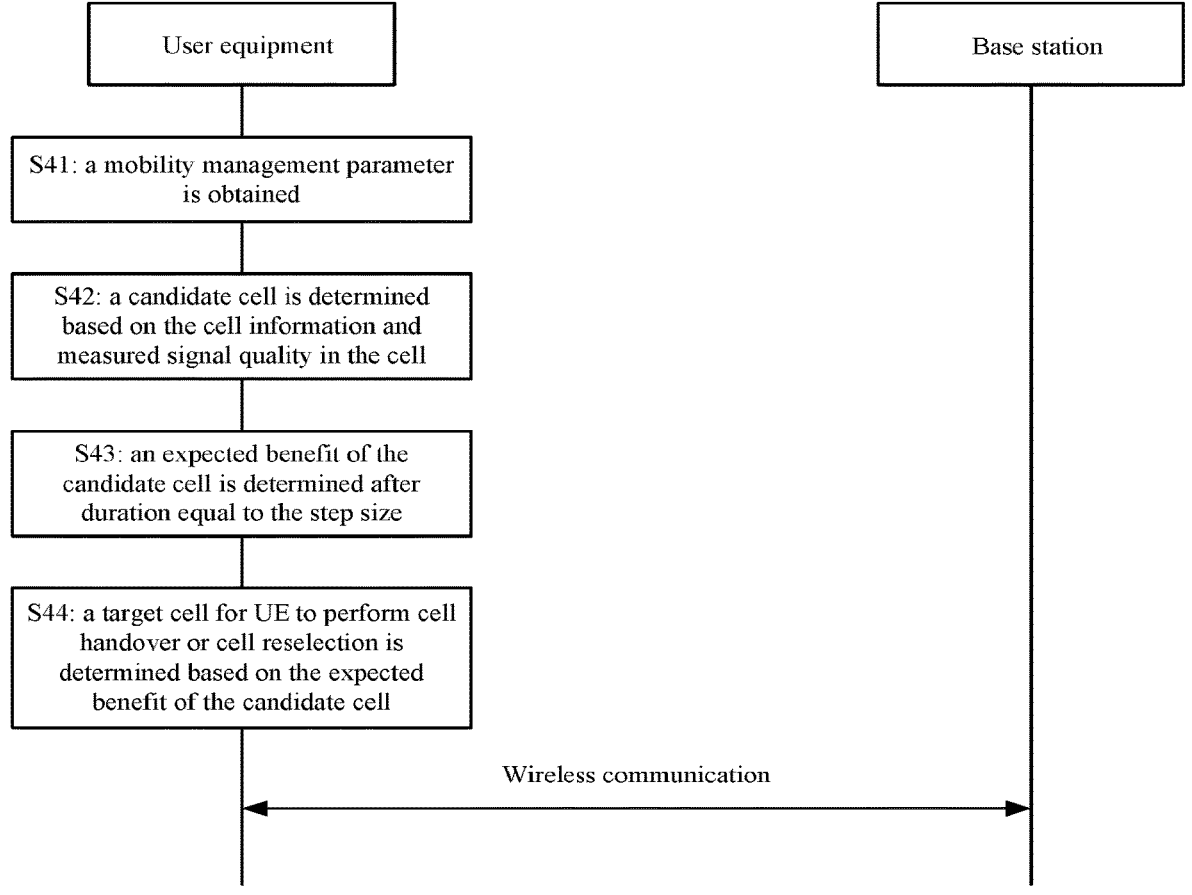
FIG. 5 is a schematic diagram of a method for determining a target cell of UE according to an exemplary embodiment.

As shown in FIG. 5, embodiments of the present disclosure provide a method for determining a target cell of UE, which is applied to UE. The method includes following steps.

In step S41, a mobility management parameter is obtained.

In some embodiments, UE obtains the mobility management parameter. The mobility management parameter includes: the cell information is that a condition for the candidate cell is RSRP greater than −98 db; the step size is 30 ms; the movement expense factor is 1; the reward type includes the transmission rate; the reward factor is: 0.8 for cell 1, 0.3 for cell 2, and 0.5 for cells 4 and 5; the accumulated reward factor is 0.5; and the threshold of number of runs is 50.

In some embodiments, UE receives the mobility management parameter sent by the base station.

In step S42, a candidate cell is determined based on the cell information and measured signal quality on the cell.

In some embodiments, UE selects cells 1, 2, and 4 as candidate cells based on the measurement that the RSRP of cells 1, 2, and 4 are greater than −98 db.

In some other embodiments, UE obtains an expected benefit of 50 MB/s for cell 1 and an expected benefit of 50 MB/s for cell 2. In the example, an expected benefit for cell 4 is not obtained.

In step S43, an expected benefit of the candidate cell is determined after duration equal to the step size.

In some embodiments, after duration equal to the step size, UE determines that current transmission rates of cell 1 and cell 2 are 50 MB/s and 60 MB/s, respectively. UE uses the benefit algorithm model to perform one calculation, and determines that the expected benefit of cell 1 is 40×0.5+50× 0.8=60 MB/s, and the expected benefit for cell 2 is 50×0.5+ 60×0.5=55 MB/s.

In step S44, a target cell for UE to perform cell handover or cell reselection is determined based on the expected benefit of the candidate cell.

In some embodiments, UE selects cell 1 with higher expected benefit as the target cell for cell handover or cell reselection.

In some embodiments, following above step S43, UE also determines the exploration probability of each candidate cell based on the expected benefit of each candidate cell.

In some other embodiments, UE also reports the exploration probability of each candidate cell.

In embodiments of the present disclosure, UE can select, based on the expected benefit of each candidate cell, the candidate cell with suitable expected benefit as the target cell for cell handover or cell reselection. Compared to the cell handover or cell reselection based on the signal strength in the cell, frequent cell handover or cell reselection caused by jitter in the signal strength in the cell can at least be reduced, thereby improving the stability of the system.

In addition, UE makes one decision on whether to perform cell handover or cell reselection at least at intervals equal to the step size, so that frequent handover caused by jitter in the signal strength in the cell can be reduced to a certain extent.

In addition, UE reports the updated exploration probability, which can provide guidance for subsequent cell handover or cell reselection conducted by current UE or other UEs in the same area.

Figure 6:
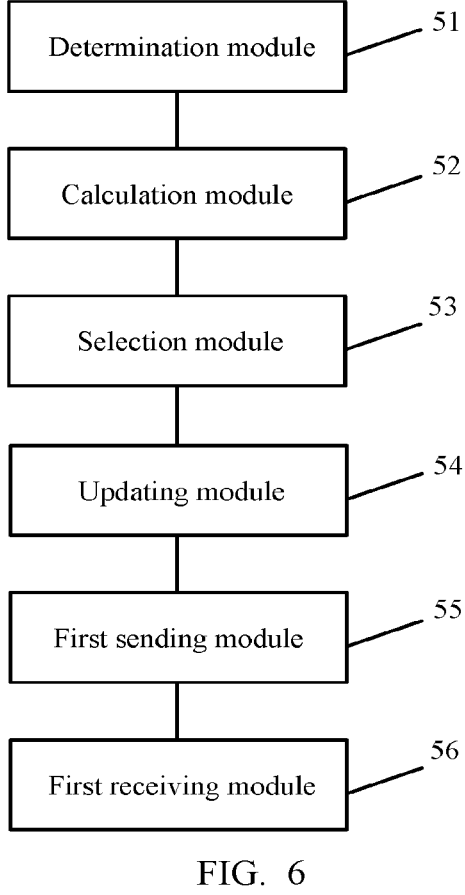
FIG. 6 is a block diagram of an apparatus for determining a target cell of UE according to an exemplary embodiment.

As shown in FIG. 6, embodiments of the present disclosure also provide an apparatus for determining a target cell of UE, which is applied to user equipment (UE), and includes a determination module 51, a calculation module 52, and a selection module 53.

The determination module 51 is configured to determine, according to measured signal quality on a cell, a candidate cell for cell handover or cell reselection.

The calculation module 52 is configured to determine, according to a mobility management parameter and a benefit algorithm model, an expected benefit for accessing the candidate cell.

The selection module 53 is configured to select, according to the expected benefit, a target cell for cell handover or cell reselection from the candidate cell.

In some embodiments, the mobility management parameter includes at least one of:

a step size, configured to indicate an interval for one calculation of the expected benefit;

a movement expense factor, configured to indicate expense for one replacement of the cell;

a reward type, configured to indicate a type of a performance indicator being as the expected benefit;

a reward type parameter corresponding to the reward type, configured to indicate a parameter of the type of the performance indicator of the expected benefit;

a reward factor, configured to indicate a parameter for scaling the reward type;

an accumulated reward factor, configured to indicate a parameter for scaling an accumulated expected benefit;

a running length threshold, configured to indicate a maximum number of runs and/or a maximum running time for the expected benefit included in a round of calculation; and an exploration probability threshold, configured to indicate a probability value the benefit algorithm model needs to achieve when performing an exploration operation.

In some embodiments, the mobility management parameter includes cell information, which is configured to identify a cell capable of being used as the candidate cell.

In some embodiments, the calculation module 52 is configured to determine, based on the mobility management parameter, the expected benefit of the candidate cell after an interval equal to the step size.

In some embodiments, the selection module 53 is configured to select the candidate cell with the highest expected benefit as the target cell for cell handover or cell reselection.

In some embodiments, the calculation module 52 is configured to determine, based on a product of an expected benefit of the candidate cell after an $i^{th}$ inference and the accumulated reward factor, as well as a product of a reward type parameter of the candidate cell after the $i^{th}$ inference and the reward factor, an expected benefit of the candidate cell after an $(i+1)^{th}$ inference, wherein i is an integer greater than 0.

In some embodiments, the apparatus further includes an updating module 54.

The updating module 54 is configured to update, according to the expected benefit and number of times the candidate cell is selected as the target cell, an exploration probability of the candidate cell.

In some embodiments, the selection module 53 is configured to select, according to the expected benefit and the exploration probability, the target cell for cell handover or cell reselection from the candidate cell.

In some embodiments, the selection module 53 is configured to select, according to the exploration probability, the target cell for cell handover or cell reselection from the candidate cell, in response to not selecting the target cell for cell handover or cell reselection from the candidate cell based on the expected benefit.

In some embodiments, the selection module 53 is configured to select a candidate cell with the exploration probability meeting with an exploration probability threshold as the target cell for cell handover or cell reselection.

Alternatively, the selection module 53 is configured to select randomly a candidate cell as the target cell for cell handover or cell reselection.

In some embodiments, the apparatus further includes a first sending module 55.

The first sending module 55 is configured to report the mobility management parameter including updated exploration probability.

In some embodiments, the apparatus further includes a first receiving module 56.

The first receiving module 56 is configured to receive a request message sent by a base station.

In some embodiments, the first sending module 55 is configured to report, based on the request message, the mobility management parameter including updated exploration probability.

In some embodiments, the first sending module 55 is configured to report the mobility management parameter including updated exploration probability, after number of inferences made based on the benefit algorithm model achieves a threshold of number of runs.

Figure 7:
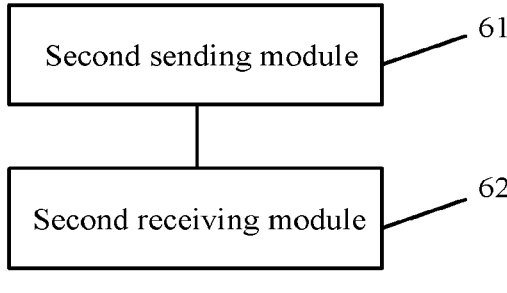
FIG. 7 is a block diagram of an apparatus for determining a target cell of UE according to an exemplary embodiment.

As shown in FIG. 7, embodiments of the present disclosure provide an apparatus for determining a target cell of UE, which is applied to a base station, and includes a second sending module 61.

The second sending module 61 is configured to send a mobility management parameter to user equipment (UE). Herein, the mobility management parameter is configured for the UE to determine an expected benefit for accessing a candidate cell based on a benefit algorithm model In some embodiments, the expected benefit is configured for the UE to select a target cell for cell handover or cell reselection from the candidate cell, and the candidate cell is determined based on measured signal quality on the cell.

In some embodiments, the mobility management parameter includes at least one of:

a step size, configured to indicate an interval for one calculation of the expected benefit;

a movement expense factor, configured to indicate expense for one replacement of the cell;

a reward type, configured to indicate a type of a performance indicator being as the expected benefit;

a reward type parameter corresponding to the reward type, configured to indicate a parameter of the type of the performance indicator of the expected benefit;

a reward factor, configured to indicate a parameter for scaling the reward type;

an accumulated reward factor, configured to indicate a parameter for scaling an accumulated expected benefit;

a running length threshold, configured to indicate a maximum number of runs and/or a maximum running time for the expected benefit included in a round of calculation; and an exploration probability threshold, configured to indicate a probability value the benefit algorithm model needs to achieve when performing an exploration operation.

In some embodiments, the mobility management parameter includes cell information, which is configured to identify a cell capable of being used as the candidate cell.

In some embodiments, the second sending module 61 is configured to send a request message to the UE.

In some embodiments, the apparatus further includes a second receiving module 62.

The second receiving module 62 is configured to receive the mobility management parameter including an updated exploration probability, returned based on the request message.

In some embodiments, the second receiving module 62 is configured to receive the mobility management parameter including the updated exploration probability, reported by the UE after number of inferences made based on the benefit algorithm model achieves a threshold of number of runs.

Specific ways in which each module of the apparatus performs operations have been described in detail in embodiments related to the methods, and will not be explained in detail herein.

Embodiments of the present disclosure provide a communication device, which includes a processor and a memory for storing instructions executable by the processor;

The processor is configured to execute the instructions to implement the method for determining a target cell of UE according to any embodiment of the present disclosure.

The user equipment herein includes a base station or user equipment.

In some embodiments, the processor can include various types of storage media, which are non temporary computer storage media that can continue to remember and store information thereon after the user equipment is powered off.

The processor can be connected to the memory via a bus or other means for reading executable programs stored on the memory, for example, to implement at least one of the methods shown in FIGS. 2 to 5.

Embodiments of the present disclosure also provide a computer storage medium, which stores computer executable programs. When the computer executable programs are executed by a processor, the method for determining a target cell of UE according to any embodiment of the present disclosure is implemented, for example, the method according to at least one of the methods shown in FIGS. 2 to 5.

Specific ways in which each module of the apparatus performs operations have been described in detail in embodiments related to the methods, and will not be explained in detail herein.

Figure 8:
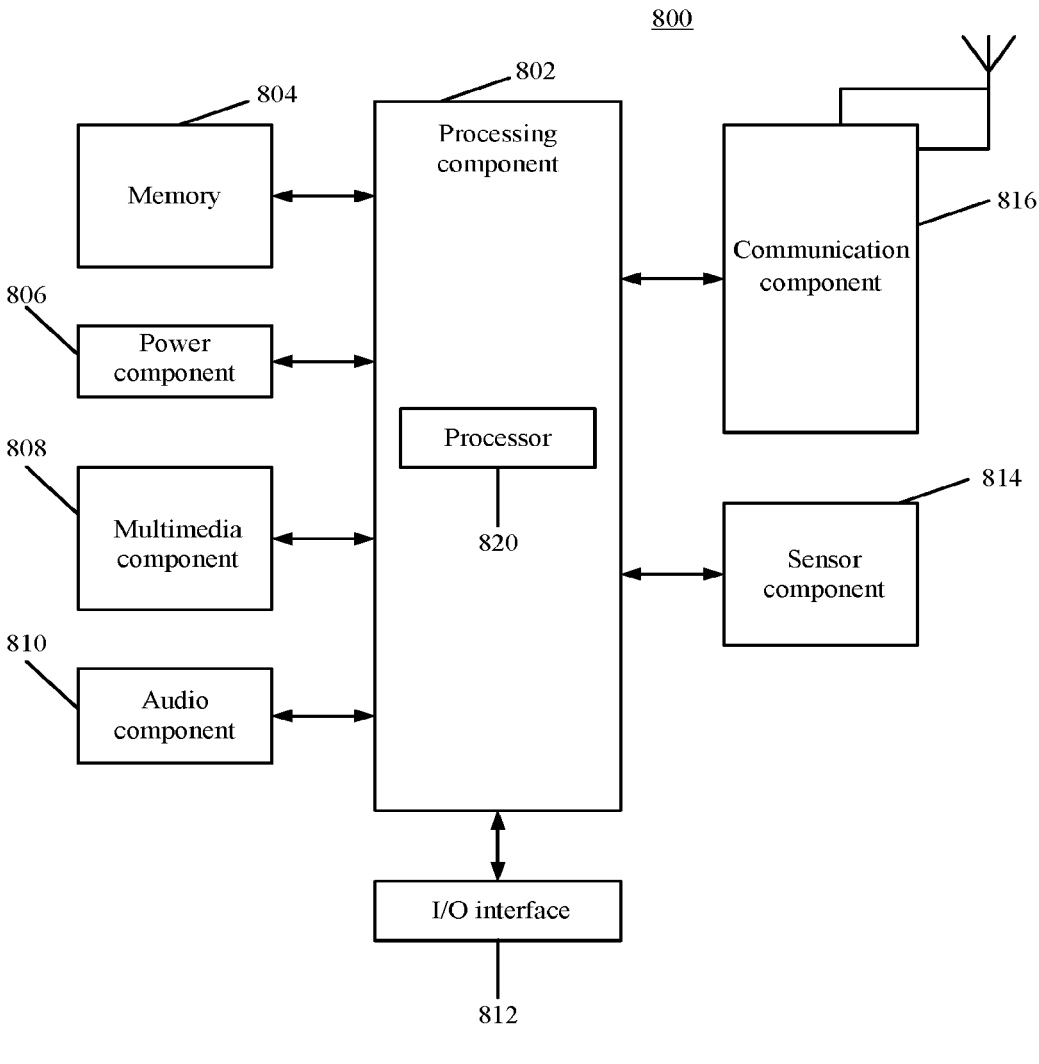
FIG. 8 is a block diagram of user equipment (UE) according to an exemplary embodiment.

FIG. 8 is a block diagram of user equipment 800 according to an exemplary embodiment. For example, user equipment 800 can be a mobile phone, a computer, a digital broadcasting user device, a messaging device, a game console, a tablet device, a medical device, a fitness device, a personal digital assistant, etc.

Referring to FIG. 8, user equipment 800 may include one or more of the following components: a processing component 802, a memory 804, a power component 806, a multimedia component 808, an audio component 810, an input/ output (I/O) interface 812, a sensor component 814, and a communication component 816.

The processing component 802 typically controls the overall operation of the user equipment 800, such as operations associated with display, telephone call, data communication, camera operation, and recording operations. The processing component 802 may include one or more processors to execute instructions to complete all or part of the methods described above. In addition, the processing component 802 may include one or more modules to facilitate interactions between the processing component 802 and other components. For example, the processing component 802 may include a multimedia module to facilitate interaction between the multimedia component 808 and the processing component 802.

The memory 804 is configured to store various types of data to support operations in the user equipment 800. Examples of such data include instructions, contact data, phone book data, messages, pictures, videos, and the like for any application or method operating on the user equipment 800. The memory 804 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 806 provides power for various components of the user equipment 800. The power component 806 may include a power management system, one or more power supplies, and other components associated with generating, managing, and distributing power for the user equipment 800.

The multimedia component 808 includes a display screen providing an output interface between the user equipment 800 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 808 includes a front camera and/or a rear camera. When the user equipment 800 is in operation mode, such as shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC), which is configured to receive an external audio signal when the user equipment 800 is in an operation mode, such as a calling mode, a recording mode, and a voice recognition mode. The received audio signal may be further stored in memory 804 or transmitted via communication component 816. In some embodiments, the audio component 810 also includes a speaker for outputting audio signals.

The I/O interface 812 provides an interface between the processing component 802 and peripheral interface modules, which can be a keyboard, click wheel, button, etc. These buttons may include, but are not limited to, the Home button, Volume button, Start button, and Lock button.

The sensor component 814 includes one or more sensors for providing various aspects of condition evaluation for the user equipment 800. For example, the sensor component 814 can detect an open/closed state of the user equipment 800, relative positioning of the components. The component is, for example, a display and a keypad of the user equipment 800. The sensor component 814 can also detect changes in the position of the user equipment 800 or one component of the user equipment 800, presence or absence of the user's contact with the user equipment 800, orientation or acceleration/deceleration of the user equipment 800 and temperature change of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 can access wireless networks based on communication standards, such as WiFi, 2G or 3G, or a combination thereof. In exemplary embodiments, the communication component 816 receives a broadcast signal or broadcast related information from an external broadcast management system via a broadcast channel. In exemplary embodiments, the communication component 816 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In exemplary embodiments, the user equipment 800 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods.

In exemplary embodiments, a non-transitory computer-readable storage medium including instructions is also provided, such as a memory 804 including instructions, which can be executed by a processor of the user equipment 800 to complete above methods. For example, the non-transitory computer-readable storage medium can be ROM, random access memory (RAM), CD-ROM, tapes, floppy disks, optical data storage devices, etc.

Figure 9:
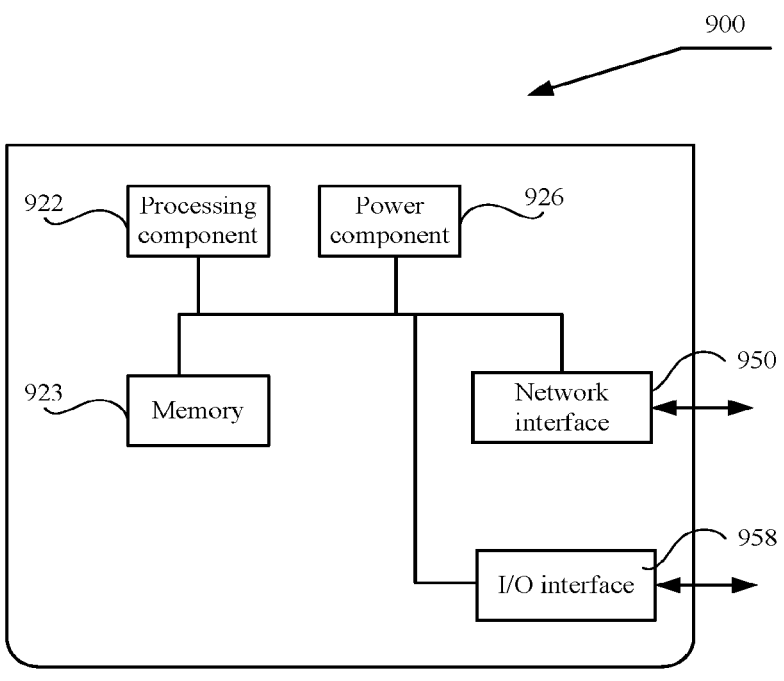
FIG. 9 is a block diagram of a base station according to an exemplary embodiment.

As shown in FIG. 9, embodiments of the present disclosure illustrate a structure of a base station. For example, a base station 900 can be provided as a network side device. Referring to FIG. 9, the base station 900 includes a processing component 922, which further includes one or more processors, as well as memory resources represented by a memory 932, for storing instructions that can be executed by the processing component 922, such as application programs. The application programs stored in memory 932 may include one or more modules corresponding to a set of instructions. In addition, the processing component 922 is configured to execute instructions to execute any of the methods applied to the base station described above, such as the methods shown in FIGS. 2 to 5.

The base station 900 may also include a power component 926 configured to perform power management of the base station 900, a wired or wireless network interface 950 configured to connect the base station 900 to the network, and an input and output (I/O) interface 958. The base station 900 can operate operating systems stored on the memory 932, such as Windows Server™, Mac OS X™, Unix™, Linux™, FreeBSD™, or similar systems.

After considering the specification and practices of the invention disclosed herein, those skilled in the art will easily come up with other implementation solutions of the present invention. The present disclosure aims to cover any variations, uses, or adaptive changes of the present invention, which follow the general principles of the present invention and include common knowledge or commonly used technical means in the art that are not disclosed in the present disclosure. The specification and embodiments are only considered exemplary, and the true scope and spirit of the present invention are defined by appended claims.

It should be understood that the present disclosure is not limited to the precise structure described above and shown in the drawings, and various modifications and changes can be made without departing from its scope. The scope of present disclosure is limited only by the appended claims.

What is claimed is:

1. A method for determining a target cell of a user equipment (UE), performed by the UE, comprising:
   determining, according to measured signal quality on a cell, a candidate cell for cell handover or cell reselection;
   determining, according to a mobility management parameter and a benefit algorithm model, an expected benefit for accessing the candidate cell; and
   selecting, according to the expected benefit, a target cell for cell handover or cell reselection from the candidate cell; and
   updating, according to the expected benefit and number of times the candidate cell is selected as the target cell, an exploration probability of the candidate cell,
   wherein selecting, according to the expected benefit, the target cell for cell handover or cell reselection from the candidate cell comprises:
   selecting, according to the expected benefit and the exploration probability, the target cell for cell handover or cell reselection from the candidate cell.

2. The method according to claim 1, wherein the mobility management parameter comprises at least one of:
   a step size, configured to indicate an interval for one calculation of the expected benefit;
   a movement expense factor, configured to indicate expense for one replacement of the cell;
   a reward type, configured to indicate a type of a performance indicator being as the expected benefit;
   a reward type parameter corresponding to the reward type, configured to indicate a parameter of the type of the performance indicator of the expected benefit;
   a reward factor, configured to indicate a parameter for scaling the reward type;
   an accumulated reward factor, configured to indicate a parameter for scaling an accumulated expected benefit;
   a running length threshold, configured to indicate a maximum number of runs and/or a maximum running time for the expected benefit comprised in a round of calculation; and
   an exploration probability threshold, configured to indicate a probability value the benefit algorithm model needs to achieve when performing an exploration operation.

3. The method according to claim 2, wherein the mobility management parameter further comprises cell information, configured to identify a cell capable of being used as the candidate cell.

4. The method according to claim 2, wherein determining, according to a mobility management parameter and a benefit algorithm model, an expected benefit for accessing the candidate cell comprises:
   determining, based on the mobility management parameter, the expected benefit of the candidate cell after an interval equal to the step size; and
   wherein selecting, according to the expected benefit, a target cell for cell handover or cell reselection from the candidate cell comprises:
   selecting a candidate cell with the highest expected benefit as the target cell for cell handover or cell reselection.

5. The method according to claim 4, wherein determining, based on the mobility management parameter, the expected benefit of the candidate cell after an interval equal to the step size comprises:
   determining, based on a product of an expected benefit of the candidate cell after an $i^{th}$ inference and the accumulated reward factor, as well as a product of a reward type parameter of the candidate cell after the $i^{th}$ inference and the reward factor, an expected benefit of the candidate cell after an $(i+1)^{th}$ inference, wherein i is an integer greater than 0.

6. The method according to claim 2, wherein selecting, according to the expected benefit and the exploration probability, the target cell for cell handover or cell reselection from the candidate cell comprises:
   in response to not selecting the target cell for cell handover or cell reselection from the candidate cell based on the expected benefit, selecting, according to the exploration probability, the target cell for cell handover or cell reselection from the candidate cell.

7. The method according to claim 6, wherein selecting, according to the exploration probability, the target cell for cell handover or cell reselection from the candidate cell comprises:
   selecting the candidate cell with the exploration probability meeting with an exploration probability threshold as the target cell for cell handover or cell reselection; or
   selecting randomly the candidate cell as the target cell for cell handover or cell reselection.

8. The method according to claim 2, further comprising:
   reporting the mobility management parameter comprising updated exploration probability.

9. The method according to claim 8, further comprising:
   receiving a request message sent by a base station; and
   wherein reporting the mobility management parameter comprising the updated exploration probability comprises:
   reporting, based on the request message, the mobility management parameter comprising the updated exploration probability.

10. The method according to claim 8, wherein reporting the mobility management parameter comprising the updated exploration probability comprises:
   reporting the mobility management parameter comprising the updated exploration probability, after number of inferences made based on the benefit algorithm model achieves a threshold of number of runs.

11. The method according to claim 2, wherein the reward type comprises one of throughput, transmission rate, and signal strength.

12. The method according to claim 2, further comprising:

updating, after an $i^{th}$ inference made based on the benefit algorithm model, at least one of an exploration probability after the $i^{th}$ inference, an $i^{th}$ expected benefit, an $(i+1)^{th}$ reward type parameter, and an $(i+1)^{th}$ reward factor, wherein i is an integer greater than 0.

13. The method according to claim 1, further comprising:

receiving the mobility management parameter sent by a base station; or determining the mobility management parameter.

14. A method for determining a target cell of a user equipment (UE), performed by a base station, comprising:

sending a mobility management parameter to the UE, wherein the mobility management parameter is configured for the UE to determine an expected benefit for accessing a candidate cell based on a benefit algorithm model, wherein the expected benefit is configured for the UE to select a target cell for cell handover or cell reselection from the candidate cell, and the candidate cell is determined based on measured signal quality on the cell;

sending a request message to the UE; and receiving the mobility management parameter comprising updated exploration probability, returned based on the request message.

15. The method according to claim 14, wherein the mobility management parameter comprises at least one of:

a step size, configured to indicate an interval for one calculation of the expected benefit;

a movement expense factor, configured to indicate expense for one replacement of the cell;

a reward type, configured to indicate a type of a performance indicator being as the expected benefit;

a reward type parameter corresponding to the reward type, configured to indicate a parameter of the type of the performance indicator of the expected benefit;

a reward factor, configured to indicate a parameter for scaling the reward type;

an accumulated reward factor, configured to indicate a parameter for scaling an accumulated expected benefit;

a running length threshold, configured to indicate a maximum number of runs and/or a maximum running time for the expected benefit comprised in a round of calculation; and an exploration probability threshold, configured to indicate a probability value the benefit algorithm model needs to achieve when performing an exploration operation.

16. The method according to claim 15, wherein the mobility management parameter further comprises cell information, configured to identify a cell capable of being used as the candidate cell.

17. The method according to claim 14, further comprising:

receiving the mobility management parameter comprising the updated exploration probability, reported by the UE after number of inferences made based on the benefit algorithm model achieves a threshold of number of runs.

18. A communication device, comprising:

a processor; and a memory for storing instructions executable by the processor, wherein the processor is configured to execute the instructions to implement the method according to claim 14.

19. A communication device, comprising:

a processor; and a memory for storing instructions executable by the processor;

wherein the processor is configured to:

determine, according to measured signal quality on a cell, a candidate cell for cell handover or cell reselection;

determine, according to a mobility management parameter and a benefit algorithm model, an expected benefit for accessing the candidate cell; and select, according to the expected benefit, a target cell for cell handover or cell reselection from the candidate cell;

update, according to the expected benefit and number of times the candidate cell is selected as the target cell, an exploration probability of the candidate cell, wherein selecting, according to the expected benefit, the target cell for cell handover or cell reselection from the candidate cell comprises:

selecting, according to the expected benefit and the exploration probability, the target cell for cell handover or cell reselection from the candidate cell.

* * * * *